Dec. 30, 1941.  A. T. BROWNE  2,268,502
MOTOR VEHICLE VENTILATING SYSTEM
Filed June 15, 1937  4 Sheets-Sheet 3
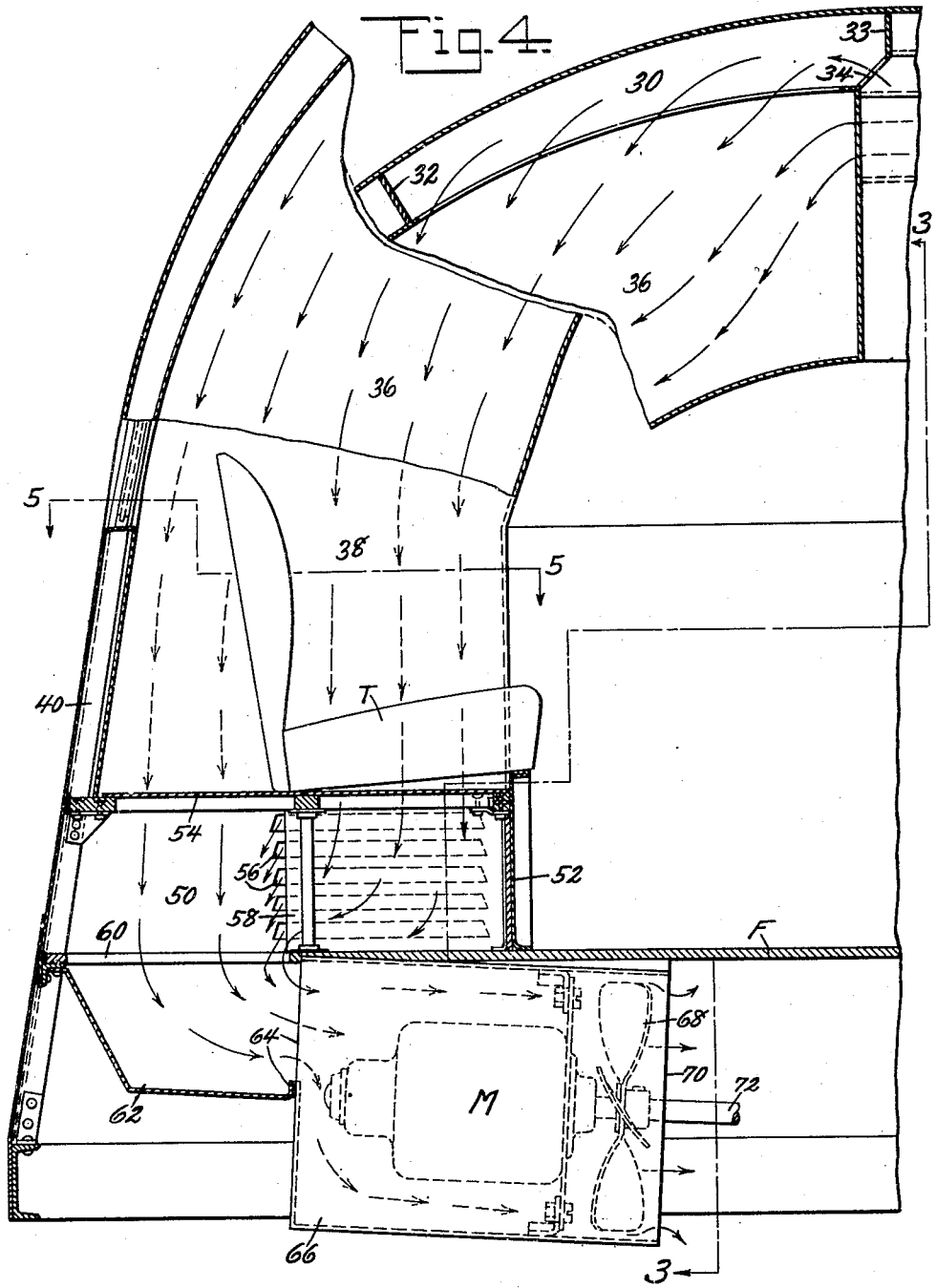
INVENTOR
Andrew T. Browne
BY
ATTORNEY

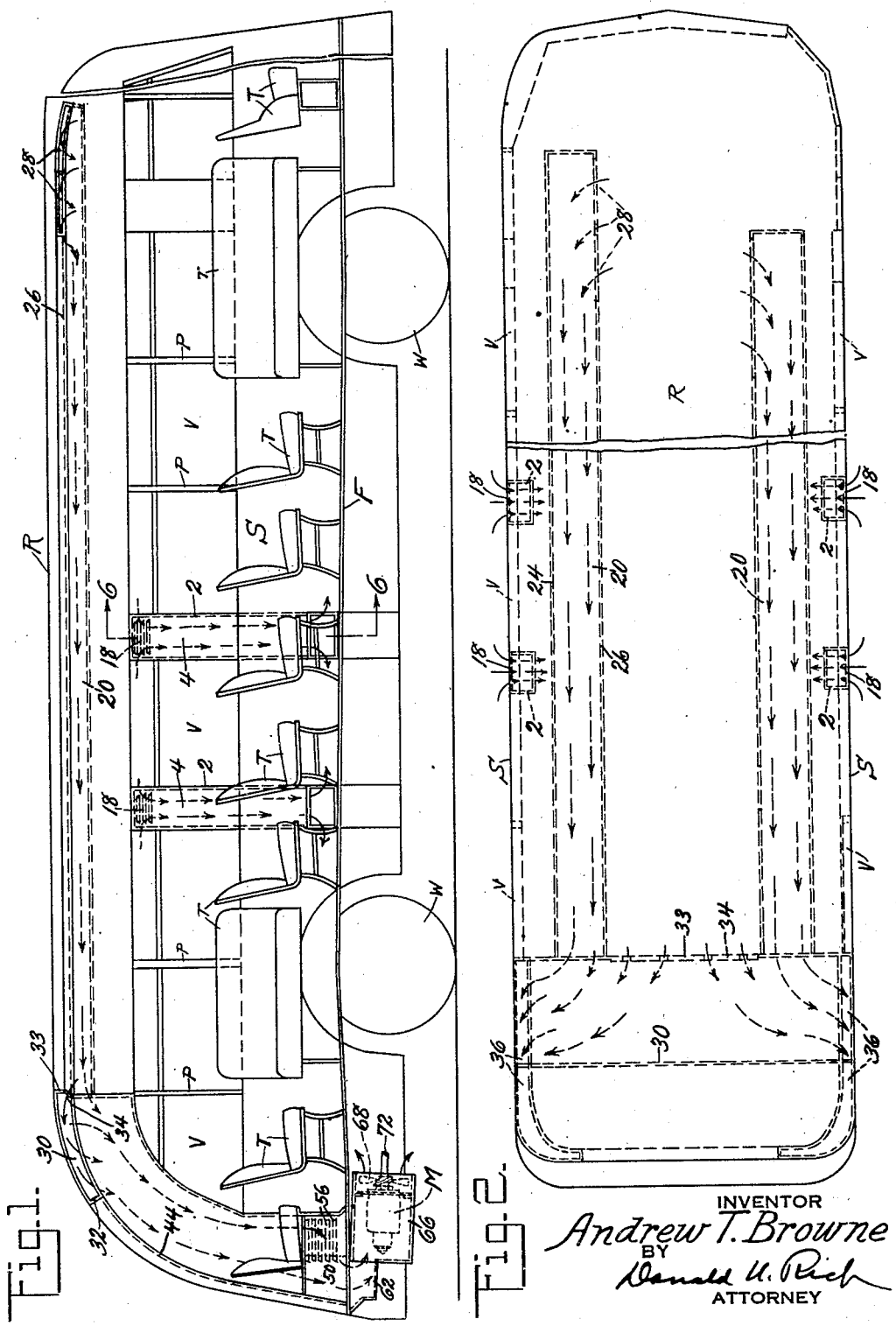

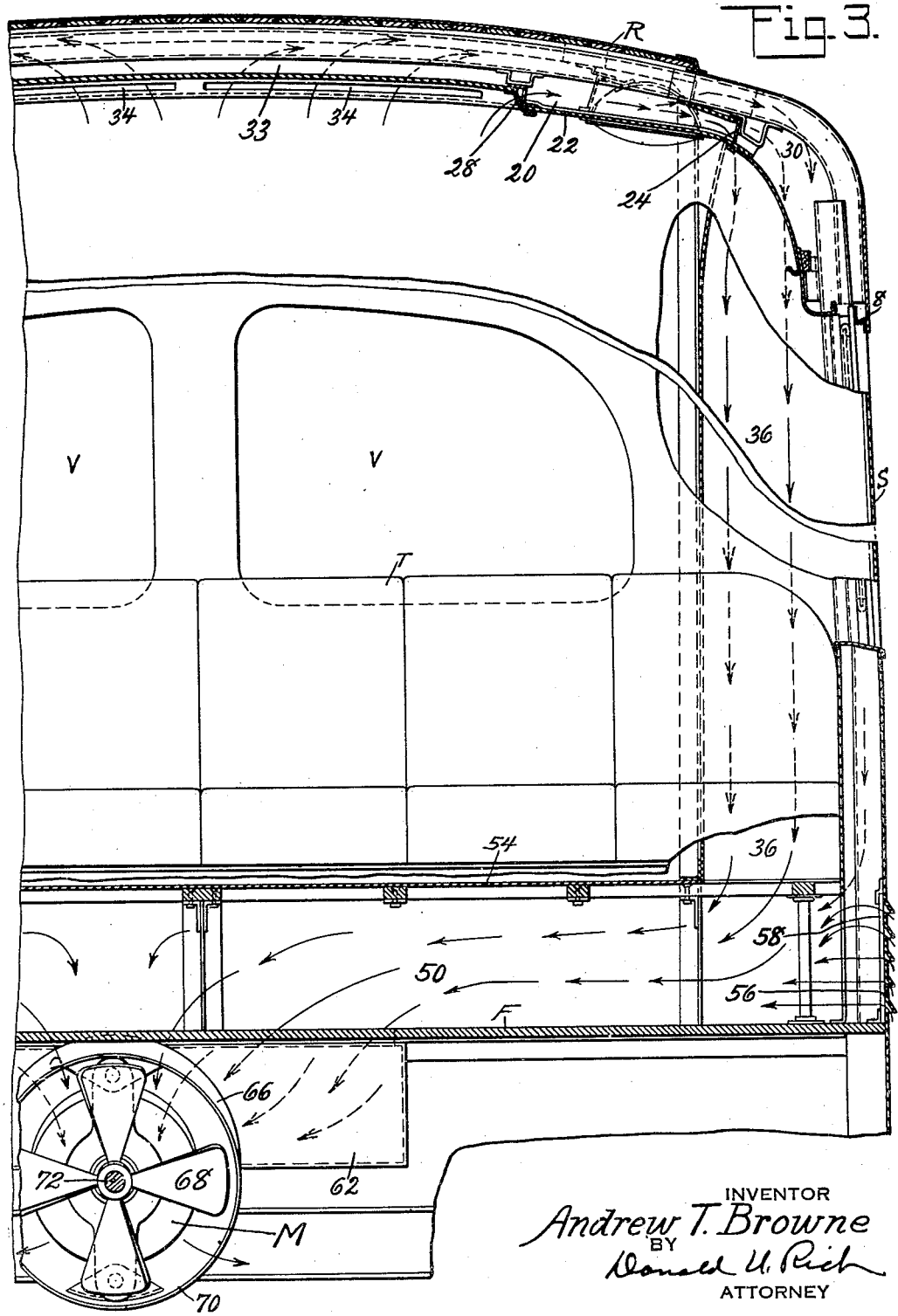

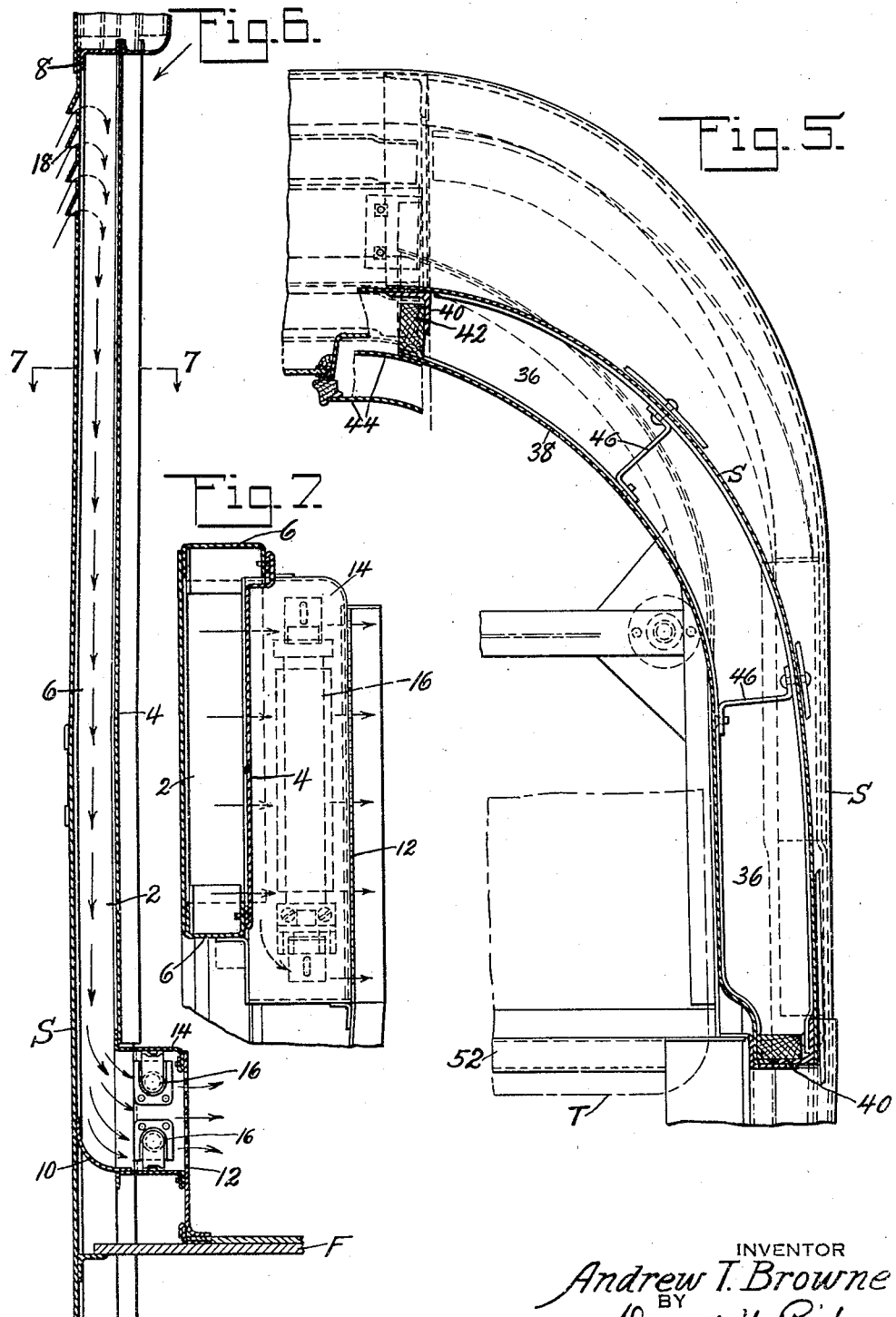

Patented Dec. 30, 1941

2,268,502

UNITED STATES PATENT OFFICE 2,268,502

MOTOR VEHICLE VENTILATING SYSTEM

Andrew T. Browne, Lansdowne, Pa., assignor to The J. G. Brill Company, Philadelphia, Pa., a corporation of Pennsylvania Application June 15, 1937, Serial No. 148,249

7 Claims. (Cl. 98—10)

This invention relates to ventilating systems in general and in particular to ventilating systems for motor vehicles.

Ventilating systems as previously constructed for motor vehicles have utilized exhaust ventilators in the roof area, which rely for their operation either upon the movement of the vehicle or the natural convection currents in the air. In some cases positive circulation of air within the vehicle was utilized but in all these cases an independent device was provided to circulate and discharge the air. It is an object, therefore, of this invention to provide an improved ventilating system of the positive type in which the air circulating means is directly connected to the vehicle propelling means.

A further object of the invention is the provision of a motor vehicle in which the traction motors are cooled by means of air withdrawn from the roof zone interior of the vehicle.

A still further object of the invention is the provision of a motor vehicle in which fresh tempered air is supplied to the body through ducts and exhausted from the body through ducts which include as a part thereof the traction motors.

These and other objects of the invention will be apparent to persons skilled in the art from a study of the following description and accompanying drawings, in which:

Figure 1 is an elevational view of the improved motor vehicle with one side removed to more clearly show the construction and primarily the air flow;

Fig. 2 is a plan view of the improved vehicle showing the air flow through the vehicle;

Fig. 3 is a sectional view substantially one-half the vehicle and taken on line 3—3 of Fig. 4;

Fig. 4 is a sectional view taken substantially at the center line of the vehicle and showing the construction and air flow at the rear portion of the vehicle;

Fig. 5 is a sectional view of one of the rear vertical air ducts and taken substantially on line 5—5 of Fig. 4;

Fig. 6 is a sectional view taken on line 6—6 of Fig. 1 and showing the fresh air inlet, and Fig. 7 is a sectional view taken substantially on line 7—7 of Fig. 6.

Referring now to the drawings in detail, it will be seen that in general the vehicle is of conventional design having wheels W supporting the vehicle and adapted to be driven by any suitable means, such as traction motor M, which in the present instance is located beneath the rear overhang. The vehicle body is constructed in any desired manner and consists of roof R, sides S and floor F upon which the seats T for the passengers and operator are mounted. In the vehicle illustrated the sides and ends are provided with windows V mounted between the side posts P. Certain of these side posts are enlarged to provide substantially box section piers 2 formed by the vehicle sides, lining 4 and vertical U-section posts 6 (Figs. 1, 6 and 7). Each of these hollow or box section piers is capped at the top by the side plate 8 and at the bottom by curved sealing plate 10 which will direct the air inwardly toward the vehicle interior through louvred openings formed in lower wall plate 12. This lower wall plate is spaced inwardly from the vehicle interior trim to which it is connected by suitable metal plates 14, thus forming a box in which electric or other heaters 16 may be mounted. Air is permitted to enter these hollow or box like piers through louvres 18 formed in the outer side sheet adjacent the upper end of the pier, thus permitting air to flow into and down through the pier and through the heater into the vehicle interior adjacent the floor zone.

In order to exhaust air from the vehicle interior a pair of ducts 20 are provided located in the ceiling adjacent each side of the vehicle. Each of these ducts is formed on the lower side by ceiling plates 22, on the outer side by vertically extending plate 24 and on the inner side by vertical plate 26 which is provided, at least adjacent its forward portion, with slotted openings 28 permitting entrance of air into the duct from the forward end of the vehicle. The rear ends of these ducts connect in a transversely extending top duct 30 formed by the ceiling plate and by suitable dividing plates 32 and 33, the latter of which is provided with slots 34 permitting the entrance of air from the rear portion of the vehicle directly into the transverse duct (Figs. 1 to 4).

The end portions of this transverse top duct merge into vertically extending ducts 36 located in each rear corner of the vehicle and formed by the vehicle side plates and interior rear finish plates 38. The edges of these vertical ducts are sealed by end posts 40 and curved post and sealing block assembly 42 which conforms substantially to the curve of the rear window opening and trim 44 as clearly shown in Figs. 1 and 5. Since this duct is curved and liable to receive considerable thrust bracing plates 46 have been provided which in the instance shown are merely short spacing clips. The lower ends of these vertical corner ducts merge into and are connected with a transversely extending lower duct 50 which is of substantially box construction and formed by vehicle side plates, floor rear seat riser 52 and seat supporting plate 54. The vehicle sides adjacent the ends of this box like lower duct are provided with louvred openings 56 adapted to be controlled by manually operated slide 58 (Fig. 3). A portion of the car floor which seals this lower duct has been removed as at 60 and this opening is surrounded by an outlet boot or chamber 62 suitably secured to the floor at its upper portion and formed with an outlet 64 adapted to be secured to the motor casing 66. This motor casing completely houses the motor as well as the motor cooling fan 68 and has one end 70 open to the atmosphere. The motor cooling fan is as in most cases mounted on the drive shaft 72 by means of which the vehicle will be driven. It is, of course, obvious that any form of prime mover, such as an internal combustion engine, could be used, but for convenience the electric motor has been indicated.

The operation of the system is as follows: During such times as the traction motor or prime mover is running the motor cooling fan 68 will, of course, be rotated forcing air out of opening 70 to the atmosphere. This fan movement will cause a partial evacuation of the motor casing and transverse lower duct, thus drawing air into the vertical ducts 38 through the transverse upper duct 30 and longitudinal top ducts 20. The removal of air from the roof zone through these latter ducts will cause a partial vacuum to exist within the vehicle causing fresh air to enter through the hollow piers 2. This fresh air will be drawn from an area remote from the roadbed, pass downwardly through the piers and inwardly through the heaters to the floor zone of the vehicle, after which it will rise to the top of the vehicle carrying with it smoke and other foreign matter for withdrawal by the ceiling ducts. It is thus seen that fresh air will be supplied to the floor zone of the car and withdrawn from the vehicle interior adjacent the ceiling zone and discharged to the atmosphere beneath the vehicle after having passed through and cooled the traction motor. Such an arrangement, of course, is very economical since a single means is used both for cooling the motor and for ventilating the vehicle. Under certain conditions, such as in the winter time when it may be desired to limit the amount of incoming fresh air, then the louvre controlled slide 58 will be adjusted permitting a certain amount of fresh air to enter directly into the transverse lower duct, thus supplying a substantially constant volume of air to the traction motor. By proper adjustment of the slide 58 any desired degree of ventilation of the vehicle interior may be obtained without in any way effecting the volume of air flowing through the traction motor for cooling purposes since by admitting air at 56 the pressure will be raised in duct 38 and the quantity of air flowing therethrough from the vehicle interior will be proportionately reduced. In other words, since the fan can only handle a certain volume of air, it is obvious that if a part of this air is supplied directly from the exterior of the vehicle then the air being drawn from the vehicle will be reduced in volume.

It is apparent that with the above described system not only is the vehicle thoroughly ventilated but the traction motor is supplied with air which will be free from grit and free moisture which would damage the motor, thus the system obviates the necessity of providing special protection as is customary for the motor. It will also be apparent that by controlling the slide 58 the rate of vehicle ventilation may be controlled without requiring any change in the speed of the motor driving the fan. In other words, the ventilation may be controlled independently of the motor.

While the invention has been described more or less in detail, it is obvious that various modifications and rearrangements may be made and all such modifications and rearrangements are contemplated as fall within the scope of the following claims.

What is claimed is:

1. In a ventilating system for motor propelled vehicles the combination of a propelling motor for the vehicle mounted beneath the floor thereof, a casing housing the motor and open to the atmosphere, a transversely extending seat located adjacent one end of the vehicle, a box-like duct located beneath the seat and connected to the casing, vertical ducts connected to the ends of the box-like duct and located in the adjacent corners of the vehicle, a conduit extending transversely across the ceiling and connecting the vertical ducts together and open to the vehicle interior adjacent the ceiling zone at one end of the vehicle, and additional conduits connected to said first named conduit and open to the vehicle interior adjacent the other end of the vehicle, a fan located within the casing, said fan drawing vitiated air through the conduits and ducts from the ceiling zone and over the motor thereby ventilating the vehicle and cooling the propelling motor.

2. In a ventilating system for motor propelled vehicles the combination of a propelling motor for the vehicle mounted beneath the floor thereof, a casing housing the motor and open to the atmosphere, a transversely extending seat located adjacent one end of the vehicle, a box-like duct located beneath the seat and connected to the casing, vertical ducts connected to the ends of the box-like duct and located in the adjacent corners of the vehicle, a conduit extending transversely across the ceiling and connecting vertical ducts together and open to the vehicle interior adjacent the ceiling zone at one end of the vehicle, and additional conduits connected to said first named conduit and open to the vehicle interior adjacent the other end of the vehicle, a fan located within the casing, said fan drawing vitiated air through the conduits and ducts from the ceiling zone and over the motor thereby ventilating the vehicle and cooling the propelling motor, and fresh air conduits supplying fresh clean air from adjacent the roof zone to the vehicle interior adjacent the floor thereof and substantially at the transverse center thereof.

3. In a ventilating system for self-propelled motor vehicles the combination of a propelling motor for the vehicle, a casing surrounding the motor, conduits for supplying clean fresh air to the vehicle interior substantially at the transverse center thereof, additional conduits for withdrawing the vitiated air from the vehicle interior at the ends thereof, a chamber connecting said additional conduits and the casing, means adjacent said motor for causing movement of air through the conduits and casing thereby ventilating the vehicle and the propelling motor, and a damper in said chamber between the vitiated air conduit and the casing to intercept the flow in the vitiated air conduits whereby the vehicle ventilation is regulated.

4. In a ventilating system for motor propelled vehicles the combination of a propelling motor for the vehicle mounted beneath the floor thereof, a casing housing the motor and open to the atmosphere, a seat mounted on the floor of the vehicle, a box-like duct located beneath the seat and connected to the casing, conduits connecting the box-like duct with ends of the vehicle interior adjacent the ceiling zone, a fan located within the casing, said fan drawing vitiated air through the conduits from the ends of the ceiling zone and over the motor whereby the interior of the vehicle is ventilated and the propelling motor cooled, and controllable means for admitting fresh air to the box-like duct whereby the rate of vehicle ventilation may be controlled without effecting the cooling of the motor.

5. In a ventilating system for vehicles the combination of a blower motor mounted beneath the floor of the vehicle, a casing housing the motor and having one end open to the atmosphere, a transversely extending seat located adjacent one end of the vehicle, a box-like duct located beneath the seat and connected to said casing, vertical ducts connected to the ends of said box-like duct and located in the adjacent corners of the vehicle, a conduit extending transversely across the ceiling and connecting the vertical ducts together and being open to the vehicle interior adjacent the ceiling zone at one end of the vehicle, and additional conduits connected to said first named conduit and open to the vehicle interior adjacent the other end thereof, a blower located within the casing and driven by said motor, said blower drawing vitiated air through the conduits and ducts from the ceiling zone and forcing the same out of the casing beneath the vehicle thereby ventilating the vehicle interior.

6. In a ventilating system for vehicles the combination of a blower motor mounted beneath the floor of the vehicle, a casing housing the motor and having one end open to the atmosphere, a transversely extending seat located adjacent one end of the vehicle, a box-like duct located beneath the seat and connected to said casing, vertical ducts connected to the ends of said box-like duct and located in the adjacent corners of the vehicle, a conduit extending transversely across the ceiling and connecting the vertical ducts together and being open to the vehicle interior adjacent the ceiling zone at the one end of the vehicle, and additional conduits connected to said first named conduit and open to the vehicle interior adjacent the other end thereof, a blower located within the casing and driven by said motor, said blower drawing vitiated air through the conduits and ducts from the ceiling zone and forcing the same out of the casing beneath the vehicle thereby ventilating the vehicle interior, and fresh air conduits supplying clean, fresh air from adjacent the roof zone to the vehicle interior adjacent the floor thereof and substantially at the transverse center of the vehicle whereby the vehicle is ventilated by air flowing from the center toward either end thereof.

7. In a ventilating system for vehicles the combination of a blower mounted beneath the floor thereof, a casing housing the blower and open to the atmosphere, a seat mounted on the floor of the vehicle, adjacent the blower, a box-like duct located beneath the seat and connected to said casing, conduits connecting the box-like duct with the ends of the vehicle interior adjacent the ceiling zone, a motor located within the casing and connected to said blower to drive the same, said blower drawing vitiated air through the conduits from the ends of the ceiling zone whereby the interior of the vehicle is ventilated, and controllable means for admitting fresh air directly to the box-like duct whereby the rate of vehicle ventilation may be controlled independently of the blower motor.

ANDREW T. BROWNE.